Aug. 15, 1933.    J. L. SHADBURN ET AL    1,922,460
TRACTOR
Filed Aug. 1, 1931    2 Sheets-Sheet 1

Inventors
J. L. Shadburn
J. H. McMurray
By C. A. Snow & Co.
Attorneys.

Aug. 15, 1933.  J. L. SHADBURN ET AL  1,922,460
TRACTOR
Filed Aug. 1, 1931   2 Sheets-Sheet 2
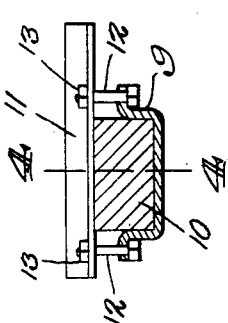
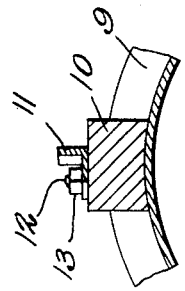
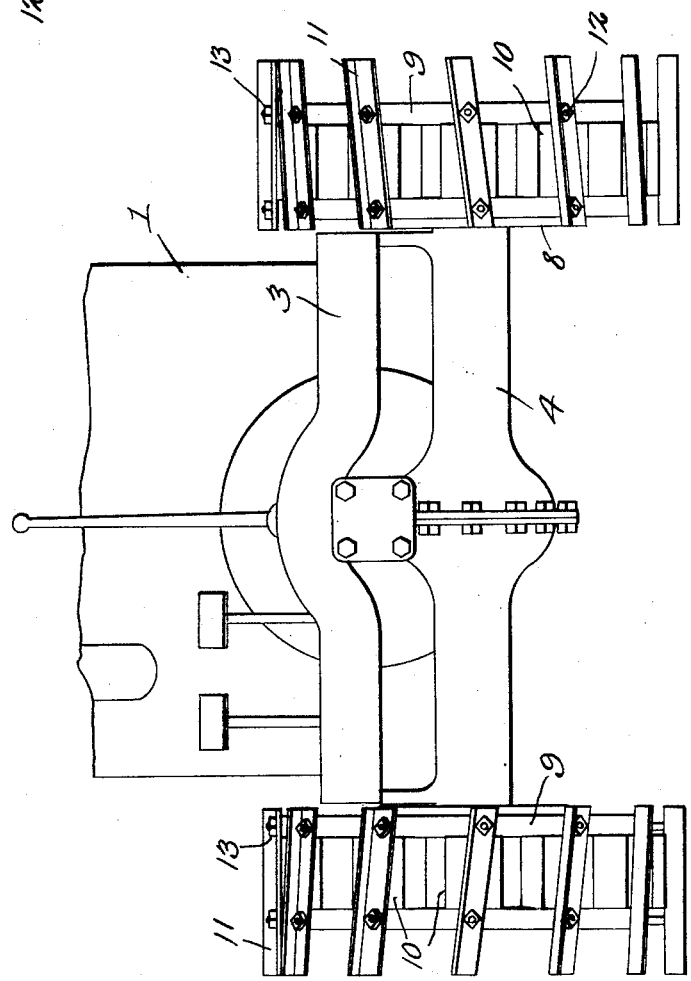
Inventors
J. L. Shadburn
J. H. McMurray
By C. A. Snow & Co.
Attorneys.

Patented Aug. 15, 1933

1,922,460

UNITED STATES PATENT OFFICE 1,922,460

TRACTOR

James L. Shadburn and Jason H. McMurray, Buford, Ga.

Application August 1, 1931. Serial No. 554,563

1 Claim. (Cl. 301—44)

This invention relates to a tractor, one of the objects being to provide a light tractor for general agricultural purposes which can be made cheaply from the parts of automobiles, whereby discarded machines can be used and a great saving of materials is thus effected.

With the foregoing and other objects in view which will appear as the description proceeds, the invention resides in the combination and arrangement of parts and in the details of construction hereinafter described and claimed, it being understood that changes in the precise embodiment of the invention herein disclosed may be made within the scope of what is claimed without departing from the spirit of the invention.

In the accompanying drawings the preferred form of the invention has been shown.

In said drawings:

Figure 2 is a rear elevation, parts in the distance being broken away.

Figure 3 is a transverse section through a portion of one of the wheels showing a cleat thereon.

Figure 4 is a section on line 4—4, Figure 3.

Figure 1:
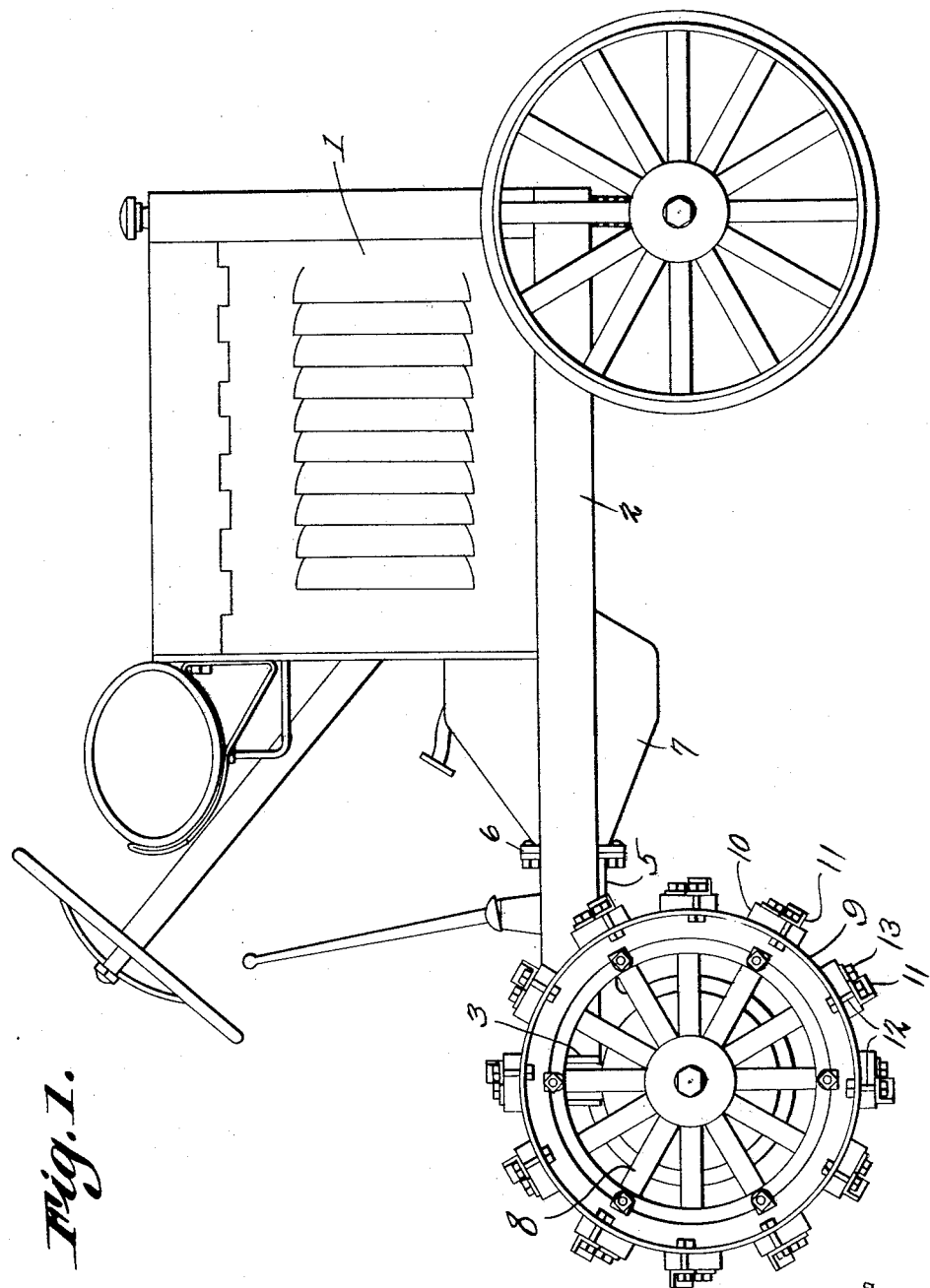
Figure 1 is a side elevation of the tractor.

Referring to the figures by characters of reference, 1 designates the front end of a small truck. The rear portions of the chassis 2 are cut away and the back end 3 is brought forward and welded or otherwise securely joined to the sides of the chassis. The differential housing and rear axle are also moved forwardly so as to be under said end, as shown at 4, and the worm bearing container 5 is bolted directly to the flanged rear end 6 of the transmission housing 7. The usual intermediate shaft with its universal joints is eliminated and a direct rigid drive is provided between the engine and the differential.

The wheels 8 are of the usual type but the channeled rim 9 of each wheel has wooden blocks 10 seated snugly therein and spaced apart. These blocks project beyond the outer periphery of the rim and resting on each of them is the base of an angle strip 11. Bolts 12 extend through the end portions of the base of each strip and also through the side flanges of the wheel rim. These bolts are tightened by nuts 13 and act to bind each strip tightly to its block and each block tightly its rim. Thus the strips 11 will constitute efficient cleats to give the desired traction.

It has been found in practice that a tractor made as described will give very efficient service and is also advantageous because it can be produced from parts of discarded automobiles and is therefore inexpensive.

This special tractor will be manufactured on the above specifications, using either new or old materials.

What is claimed is:

A driving wheel for a tractor including a rim having an annular channel and laterally extended annular flanges at the sides of the channel, separate non-resilient blocks seated in the channels and bearing at their ends against the respective sides thereof, said blocks being extended outwardly from the channel and being imperforate, obliquely disposed angle strips resting on the respective blocks and constituting cleats, each of these strips being extended beyond the respective ends of the block and the respective sides of the rim in which the blocks are seated, and bolts extending through the strips and the respective flanges of the rim for fastening the strip to the rim and to clamp the blocks between the strips and rim, said bolts being so located in the flanges of the rim as to hold the strips positively in their oblique position.

JAMES L. SHADBURN.
JASON H. McMURRAY.